United States Patent
Hasebe et al.

(10) Patent No.: US 8,404,399 B2
(45) Date of Patent: *Mar. 26, 2013

(54) FUEL CELL

(75) Inventors: Hiroyuki Hasebe, Chigasaki (JP);
Yukinori Akamoto, Chiba-ken (JP);
Hideyuki Oozu, Yokohama (JP);
Hidenori Suzuki, Yokohama (JP);
Koichi Kawamura, Yokohama (JP);
Yuuichi Sato, Tokyo (JP); Genta Oomichi, Yokohama (JP); Nobuyasu Negishi, Yokohama (JP); Takashi Shimoyamada, Kawasaki (JP); Yuichi Yoshida, Yokohama (JP); Hirofumi Kan, Tokyo (JP); Kenichi Takahashi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 764 days.
This patent is subject to a terminal disclaimer.

(21) Appl. No.: 12/521,382

(22) PCT Filed: Dec. 21, 2007

(86) PCT No.: PCT/JP2007/001452
§ 371 (c)(1),
(2), (4) Date: Jun. 26, 2009

(87) PCT Pub. No.: WO2008/081576
PCT Pub. Date: Jul. 10, 2008

(65) Prior Publication Data
US 2011/0008704 A1    Jan. 13, 2011

(30) Foreign Application Priority Data

Dec. 28, 2006  (JP) ................. P2006-353947
Feb. 23, 2007  (JP) ................. P2007-043860
Sep. 27, 2007  (JP) ................. P2007-251652

(51) Int. Cl.
*H01M 8/04* (2006.01)

(52) U.S. Cl. .................................... 429/512

(58) Field of Classification Search ........... 429/400–535
See application file for complete search history.

(56) References Cited

U.S. PATENT DOCUMENTS 6,981,877 B2   1/2006   Ren et al.
7,563,524 B2   7/2009   Matsuoka et al.
(Continued)

FOREIGN PATENT DOCUMENTS

EP    1 758 188 A1    2/2007
JP    2000-268836     9/2000
(Continued)

OTHER PUBLICATIONS

International Search Report issued by Japanese Patent Office in International Application No. PCT/JP2007/001452 dated Apr. 8, 2008.
(Continued)

*Primary Examiner* — Patrick Ryan
*Assistant Examiner* — Muhammad Siddiquee
(74) *Attorney, Agent, or Firm* — Finnegan, Henderson, Farabow, Garrett & Dunner, L.L.P.

(57) ABSTRACT

The present invention relates to a fuel cell including: a membrane electrode assembly (2) having a fuel electrode (13), an air electrode (16), and an electrolyte membrane (17) sandwiched therebetween; and a fuel storage unit (4) storing a liquid fuel. The fuel cell is capable of continuously generating electricity for long hours only by being replenished with a fuel, and therefore, attempts have been made to miniaturize the fuel cell to use it as a power source of portable electronic devices. When the membrane electrode assembly and the fuel storage unit in the fuel cell are connected via a flow path, a fuel supply state becomes uneven depending on the shape and the like of the flow path even though a supply amount of the fuel can be adjusted, which causes a problem such as a decrease in an output of the fuel cell. The present invention solves the aforethe problem by providing, in the fuel cell, a fuel distributing mechanism (3) which supplies the fuel to a plurality of places of the fuel electrode, and connecting the fuel distributing mechanism and the fuel storage unit via the flow path (5).

24 Claims, 10 Drawing Sheets

U.S. PATENT DOCUMENTS

| | | | |
|---|---|---|---|
| 2003/0059659 A1* | 3/2003 | Kamo et al. | 429/32 |
| 2005/0100773 A1 | 5/2005 | Kashino et al. | |
| 2005/0282048 A1* | 12/2005 | Kamo et al. | 429/12 |
| 2006/0003196 A1* | 1/2006 | Kohno et al. | 429/12 |
| 2006/0029851 A1 | 2/2006 | Santiago et al. | |
| 2006/0194093 A1* | 8/2006 | Kibune et al. | 429/34 |
| 2006/0204802 A1* | 9/2006 | Specht | 429/22 |
| 2007/0059575 A1 | 3/2007 | Kan et al. | |
| 2007/0077480 A1* | 4/2007 | Curello et al. | 429/34 |

FOREIGN PATENT DOCUMENTS

| | | |
|---|---|---|
| JP | 2004-079506 | 3/2004 |
| JP | 2004-178818 | 6/2004 |
| JP | 2004-281416 | 10/2004 |
| JP | 2005-518646 | 6/2005 |
| JP | 2006-004793 | 1/2006 |
| JP | 2006-019145 | 1/2006 |
| JP | 2006-085952 | 3/2006 |
| JP | 2006-196414 | 7/2006 |
| JP | 2006-269413 | 10/2006 |
| WO | WO 03/069709 A1 | 8/2003 |
| WO | WO 2005/112172 A1 | 11/2005 |

OTHER PUBLICATIONS

International Preliminary Report on Patentability and Written Opinion issued by the International Bureau of WIPO on Jun. 30, 2009, for International Application No. PCT/JP2007/001452.

Notice to Submit Argument issue by the Korean Patent Office on Apr. 19, 2011, for Korean Patent Application No. 10-2009-7014725, and English-language translation thereof.

Notice of Reasons for Rejection issued by the Japanese Patent Office on Dec. 11, 2012, for Japanese Patent Application No. 2007-251652, and English-language translation thereof.

* cited by examiner

FUEL CELL

TECHNICAL FIELD

The present invention relates to a fuel cell using a liquid fuel.

BACKGROUND ART

In recent years, in order to enable long-hour use of various kinds of mobile electronic devices such as laptop personal computers and portable phones without charging, attempts have been made to use fuel cells as power sources of these portable electronic devices. The fuel cell has a feature that it is capable of generating electricity only by being supplied with a fuel and air and is capable of continuously generating electricity for long hours by being replenished with the fuel. Therefore, the fuel cell can be the to be an extremely advantageous system as a power source of portable electronic devices if it can be made compact.

A direct methanol fuel cell (DMFC) is expected to be a promising power source of portable electronic devices because it can be made compact and its fuel can be handled easily. As a method of supplying a liquid fuel in the DMFC, there have been known an active method such as a gas supply type and a liquid supply type, and a passive method such as an internal vaporization type in which a liquid fuel in a fuel storage unit is vaporized inside the cell to be supplied to a fuel electrode.

Among them, the passive method such as the internal vaporization type is especially advantageous in terms of the miniaturization of the DMFC. There has been proposed a passive-type DMFC which is structured such that, for example, a membrane electrode assembly (fuel cell unit) having a fuel electrode, an electrolyte membrane, and an air electrode is disposed on a fuel storage unit made of a resin box-shaped container (see, for example, reference 1). In the direct supply of a fuel vaporized from the fuel storage unit to the fuel cell unit, it is important to enhance controllability of an output of the fuel cell, but sufficient controllability has not necessarily been obtained in the current passive-type DMFC.

Meanwhile, it has been under consideration to connect a fuel cell unit of a DMFC and a fuel storage unit via a flow path (see references 2 to 4). Since a liquid fuel supplied from the fuel storage unit is supplied to the fuel cell unit via the flow path, it is possible to adjust a supply amount of the liquid fuel based on the shape, diameter, and the like of the flow path. However, depending on the structure for supplying the liquid fuel from the flow path, a supply state of the fuel to the fuel cell unit becomes uneven, which may possibly lower an output of the fuel cell. For example, depending on the shape of the flow path and a supply method of the fuel from the flow path, the fuel is sequentially consumed as the liquid fuel flows in the flow path, so that the concentration of the fuel at an end side of the flow path becomes low. Therefore, in the fuel cell unit, an electricity generation reaction becomes inactive in its portion close to the end of the flow path, resulting in a decrease in the output.

The patent document 3 describes that a pump is used to supply a liquid fuel from a fuel storage unit to a flow path. The patent document 3 also describes that a means for forming an electric field forming an electroosmosis flow is used instead of the pump. The patent document 4 describes that an electroosmosis flow pump is used to supply a liquid fuel or the like. A pump is effective in a fuel cell employing a fuel circulating structure, but in a fuel cell such as a passive-type DMFC in which a fuel is not circulated, the simple use of a pump only results in an increase in a consumption amount of the fuel and makes it difficult to cause a uniform electricity generation reaction in the whole fuel cell unit.

Reference 1: WO 2005/112172 A1
Reference 2: JP-A 2005-518646 (KOKAI)
Reference 3: JP-A 2006-085952 (KOKAI)
Reference 4: US 2006/0029851 A1

DISCLOSURE OF THE INVENTION

It is an object of the present invention to provide a fuel cell which realizes higher efficiency in its electricity generation reaction by making a supply state of a fuel to a fuel cell unit uniform and whose output can be improved without hindering the miniaturization and the like of the fuel cell.

A fuel cell according to the present invention includes: a membrane electrode assembly having a fuel electrode, an air electrode, and an electrolyte membrane sandwiched by the fuel electrode and the air electrode; a fuel distributing mechanism disposed on a fuel electrode side of the membrane electrode assembly to supply a fuel to a plurality of places of the fuel electrode; and a fuel storage unit storing a liquid fuel and connected to the fuel distributing mechanism via a flow path.

EXPLANATION OF REFERENCES 1, 30, 50 . . . fuel cell, 2 . . . fuel cell unit (MEA), 2A . . . gas vent hole, 3 . . . fuel distributing mechanism, 4 . . . fuel storage unit, 5 . . . flow path, 11 . . . anode catalyst layer, 12 . . . anode gas diffusion layer, 13 . . . anode (fuel electrode), 14 . . . cathode catalyst layer, 15 . . . cathode gas diffusion layer, 16 . . . cathode (air electrode), 17 . . . electrolyte membrane, 21 . . . fuel injection port, 22 . . . fuel discharge port, 23, 23k . . . fuel distributing plate, 24 . . . hollow portion, 25 . . . thin tube, 26 . . . branching point, 27, 56 . . . porous body, 31 . . . pump, 32 . . . control circuit, 33 . . . fuel shut-off valve, 34 . . . latch valve, 39 . . . balance valve, 51 . . . flow path plate, 52 . . . fuel distributing groove, 53 . . . diffusion plate, 55 . . . fuel diffusion space

BEST MODE FOR CARRYING OUT THE INVENTION

Figure 1:
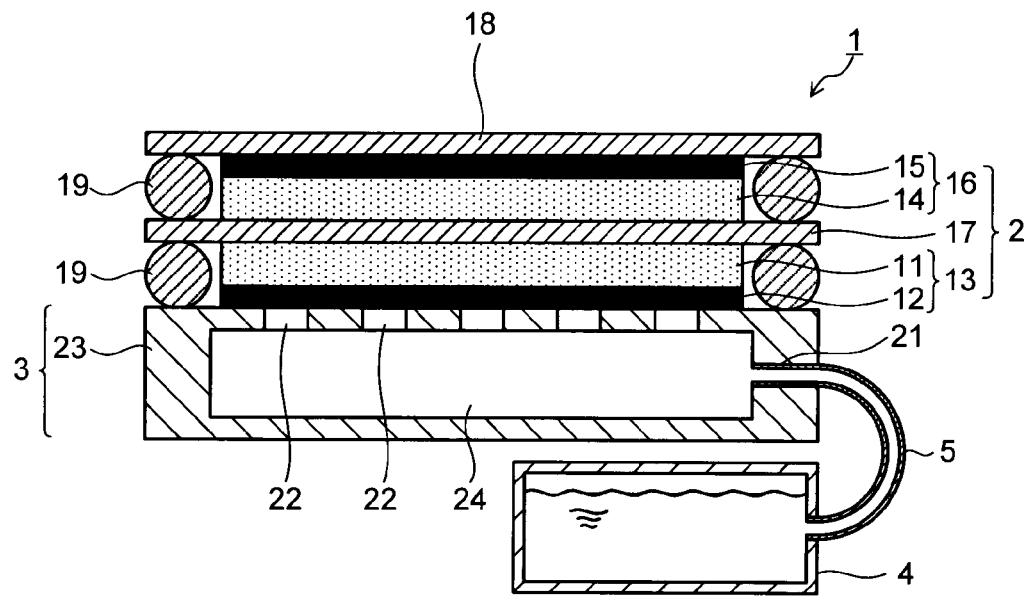
FIG. 1 is a cross-sectional view showing the structure of a fuel cell according to a first embodiment of the present invention.

Hereinafter, modes for carrying out the invention will be described with reference to the drawings. FIG. 1 is a cross-sectional view showing the structure of a fuel cell according to a first embodiment of the present invention. A fuel cell 1 shown in FIG. 1 includes: a fuel cell unit 2 constituting an electromotive unit; a fuel distributing mechanism 3 supplying a fuel to the fuel cell unit 2; a fuel storage unit 4 storing a liquid fuel; and a flow path 5 connecting the fuel distributing mechanism 3 and the fuel storage unit 4.

The fuel cell unit 2 has a membrane electrode assembly (MEA) including: an anode (fuel electrode) 13 having an anode catalyst layer 11 and an anode gas diffusion layer 12; a cathode (air electrode/oxidant electrode) 16 having a cathode catalyst layer 14 and a cathode gas diffusion layer 15; and a proton-(hydrogen ion-)conductive electrolyte membrane 17 sandwiched by the anode catalyst layer 11 and the cathode catalyst layer 14.

Examples of catalysts contained in the anode catalyst layer 11 and the cathode catalyst layer 14 include simple substances of platinum-group elements such as Pt, Ru, Rh, Ir, Os, and Pd, alloys containing a platinum-group element, and the like. For the anode catalyst layer 11, it is preferable to use Pt—Ru, Pt—Mo, or the like having high resistance against methanol, carbon monoxide, and the like. For the cathode catalyst layer 14, it is preferable to use Pt, Pt—Ni, or the like. However, the catalysts are not limited to these, and various kinds of substances having catalytic activity can be used. The catalysts may be supported catalysts using a conductive supporter such as a carbon material or may be non-supported catalysts.

Examples of a proton-conductive material constituting the electrolyte membrane 17 include fluorine-based resin such as a perfluorosulfonic acid polymer having a sulfonic acid group (Nafion (product name, manufactured by Du Pont), Flemion (product name, manufactured by Asahi Glass Co., Ltd.), and the like), organic materials such as hydrocarbon-based resin having a sulfonic acid group, and inorganic materials such as tungstic acid and phosphotungstic acid. However, the proton-conductive electrolyte membrane 17 is not limited to any of these.

The anode gas diffusion layer 12 stacked on the anode catalyst layer 11 not only serves to uniformly supply the fuel to the anode catalyst layer 11 but also serves as a current collector of the anode catalyst layer 11. The cathode gas diffusion layer 15 stacked on the cathode catalyst layer 14 not only serves to uniformly supply an oxidant to the cathode catalyst layer 14 but also serves as a current collector of the cathode catalyst layer 14. The anode gas diffusion layer 12 and the cathode gas diffusion layer 15 are each made of a conductive porous base material such as, for example, carbon paper.

A conductive layer is stacked on each of the anode gas diffusion layer 12 and the cathode gas diffusion layer 15 when necessary. As each of the conductive layers, a mesh, a porous film, a thin film, or the like made of a conductive metallic material such as, for example, Au is used. Between the electrolyte membrane 17 and the fuel distributing mechanism 3 and between the electrolyte membrane 17 and a cover plate 18, O-rings 19 made of rubber are interposed respectively, and they prevent the leakage of the fuel and the leakage of the oxidant from the fuel cell unit (MEA) 2.

The cover plate 18 has openings, not shown, for letting air in as the oxidant. Between the cover plate 18 and the cathode 16, a moisture retention layer and a surface layer are disposed when necessary. The moisture retention layer is impregnated with part of water generated in the cathode catalyst layer 14 to inhibit the evaporation of the water and at the same time promotes the uniform diffusion of the air to the cathode catalyst layer 14. The surface layer adjusts an intake amount of the air and has a plurality of air intake ports whose number, size, and so on are adjusted according to the intake amount of the air.

In the fuel storage unit 4, a liquid fuel suitable for the fuel cell unit 2 is stored. Examples of the liquid fuel include methanol fuels such as methanol aqueous solutions with various concentrations and pure methanol. The liquid fuel is not limited to the methanol fuel. The liquid fuel may be, for example, an ethanol fuel such as an ethanol aqueous solution or pure ethanol, a propanol fuel such as a propanol aqueous solution or propanol, a glycol fuel such as a glycol aqueous solution or glycol, dimethylether, formic acid, or other liquid fuel. In any case, a liquid fuel according to the fuel cell unit 2 is stored in the fuel storage unit 4.

On the anode (fuel electrode) 13 side of the fuel cell unit 2, the fuel distributing mechanism 3 is disposed. The fuel distributing mechanism 3 is connected to the fuel storage unit 4 via the flow path 5 such as a pipe, of the liquid fuel. The liquid fuel is led into the fuel distributing mechanism 3 from the fuel storage unit 4 via the flow path 5. The flow path 5 is not limited to the pipe independent of the fuel distributing mechanism 3 and the fuel storage unit 4. For example, when the fuel distributing mechanism 3 and the fuel storage unit 4 are stacked to be integrated, the flow path 5 may be a liquid fuel flow path connecting these. What is necessary is that the fuel distributing mechanism 3 is connected to the fuel storage unit 4 via the flow path 5.

Figure 2:
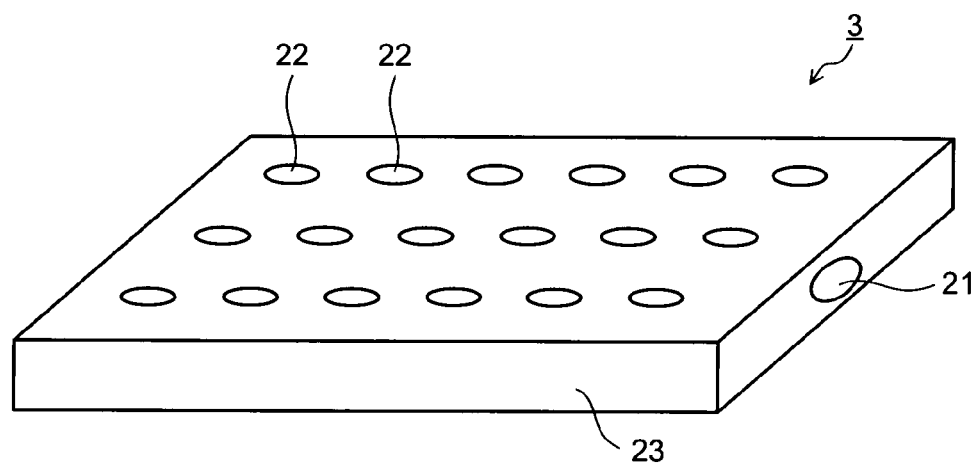
FIG. 2 is a perspective view showing the structure of a fuel distributing mechanism used in the fuel cell shown in FIG. 1.

As shown in FIG. 2, the fuel distributing mechanism 3 includes a fuel distributing plate 23 having at least one injection port 21 into which the liquid fuel flows via the flow path 5 and a plurality of fuel discharge ports 22 from which the liquid fuel and its vaporized components are discharged. As shown in FIG. 1, inside the fuel distributing plate 23, a hollow portion 24 serving as a passage of the liquid fuel led in from the fuel injection port 21 is provided. The plural fuel discharge ports 22 are directly connected to the hollow portion 24 functioning as the fuel passage.

The liquid fuel led into the fuel distributing mechanism 3 via the fuel injection port 21 enters the hollow portion 24 and then is led to the plural fuel discharge ports 22 via the hollow portion 24 functioning as the fuel passage. On the plural fuel discharge ports 22, for example, a gas/liquid separator (not shown) allowing the permeation of only the vaporized components of the liquid fuel and does not allow the permeation of the liquid component may be disposed. Consequently, the vaporized components of the liquid fuel is supplied to the anode (fuel electrode) 13 of the fuel cell unit 2. The gas/liquid separator may be disposed as a gas/liquid separating film or the like between the fuel distributing mechanism 3 and the anode 13. The vaporized components of the liquid fuel are discharged from the plural fuel discharge ports 22 toward a plurality of places of the anode 13.

The fuel distributing plate 23 has the fuel discharge ports 22 at a plurality of places of its surface in contact with the anode 13 so that the fuel can be supplied to the whole fuel cell unit 2. The number of the fuel discharge ports 22 may be two or more, but in order to make a fuel supply amount uniform in a surface of the fuel cell unit 2, the number of the fuel discharge ports 22 formed is preferably 0.1 to 10/cm². When the number of the fuel discharge ports 22 is less than 0.1/cm², the fuel supply amount to the fuel cell unit 2 cannot be made fully uniform. Even when the number of the fuel discharge ports 22 is over 10/cm², a higher effect cannot be obtained.

The fuel released from the fuel distributing mechanism 3 is supplied to the anode (fuel electrode) 13 of the fuel cell unit 2 as described above. In the fuel cell unit 2, the fuel diffuses in the anode gas diffusion layer 12 to be supplied to the anode catalyst layer 11. When a methanol fuel is used as the liquid fuel, an internal reforming reaction of methanol expressed by the following expression (1) takes place in the anode catalyst layer 11. When pure methanol is used as the methanol fuel, water generated in the cathode catalyst layer 13 and water in the electrolyte membrane 17 react with methanol, so that the internal reforming reaction of the expression (1) takes place. Alternatively, the internal reforming reaction is caused by another reaction mechanism not requiring water.

$$CH_3OH+H_2O \rightarrow CO_2+6H^++6e^- \quad (1)$$

Electrons ($e^-$) generated by this reaction are led outside via the current collector, and they serve as what is called electricity to operate a portable electronic device or the like, and thereafter are led to the cathode (air electrode) 16. Further, protons ($H^+$) generated by the internal reforming reaction of the expression (1) are led to the cathode 16 via the electrolyte membrane 17. Air as the oxidant is supplied to the cathode 16. In the cathode catalyst layer 14, the electrons ($e^-$) and protons ($H^+$) reaching the cathode 16 react with oxygen in the air according to the following expression (2), and this reaction is accompanied by the generation of water.

$$6e^-+6H^++(3/2)O_2 \rightarrow 3H_2O \quad (2)$$

In order to increase power generated by the aforethe electricity generation reaction of the fuel cell unit 2, both smooth catalysis and more effective contribution of the whole electrode of the fuel cell unit 2 to the electricity generation are important. In this respect, when the fuel discharge port through which the fuel is supplied to the fuel cell unit 2 is provided at one place, the fuel concentration drastically lowers at a portion more apart from the fuel discharge port, even though the fuel concentration near the fuel discharge port is high enough to generate electricity. Therefore, an average output of the whole fuel cell becomes only a low value, being influenced by a portion where the supply amount of the fuel is small.

A possible means for increasing the fuel concentration may be to increase a supply amount of the liquid fuel. However, simply increasing the supply amount of the liquid fuel results in too high a fuel concentration near the fuel discharge port, which causes a phenomenon that the fuel flows to the air electrode without any reaction (a phenomenon called crossover). The crossover would be a cause of the deterioration in fuel efficiency, a voltage drop accompanying the direct reaction of the fuel in the air electrode, an output decrease ascribable to the voltage drop, and so on. Further, in a conventional fuel cell, the fuel is circulated by a circulation pump, but this requires a reservoir tank storing the fuel, a concentration regulating mechanism, and so on, which unavoidably leads to an increase in the size of the device.

In the fuel cell 1 of this embodiment, the fuel distributing mechanism 3 having the plural fuel discharge ports 22 is employed as described above. The liquid fuel led into the fuel distributing mechanism 3 is led to the plural fuel discharge ports 22 via the hollow portion 24. The hollow portion 24 of the fuel distributing mechanism 3 functions as a buffer, and therefore, the fuel with a prescribed concentration is discharged from each of the plural fuel discharge ports 22. Since the plural fuel discharge ports 22 are arrange so that the fuel is supplied to the whole surface of the fuel cell unit 2, it is possible to make the fuel supply amount to the fuel cell unit 2 uniform.

Specifically, the distribution of the fuel in the surface of the anode (fuel electrode) 13 is smoothed, so that a proper amount of the fuel required for the electricity generation reaction in the fuel cell unit 2 can be supplied to the whole fuel cell unit 2. Therefore, it is possible to efficiently cause the electricity generation reaction in the fuel cell unit 2 without any upsizing, complication, and the like of the fuel cell 1. This enables improvement in the output of the fuel cell 1. In other words, it is possible to increase the output and its stability without impairing the advantage of the fuel cell 1 in which the fuel is not circulated.

As a concrete example (example 1) of the first embodiment, a fuel cell 1 having the fuel distributing mechanism 3 in which the fuel discharge ports 22 were formed with a 5 mm mesh was fabricated. The shape of the MEA 2 was 40×80 mm, and methanol with a 90% concentration was used as the liquid fuel. In the fuel cell of the example 1, a 20 mW/cm² average output was obtained. Further, a fuel cell (comparative example 1) which had the same structure as that of the example 1 except that only one fuel discharge port was provided in a center portion of the MEA was fabricated. In the fuel cell of the comparative example 1, an average output obtained was only 5 mW/cm².

To clarify this phenomenon, temperature distributions on surfaces of their air electrodes were examined by a thermoviewer. The result showed that in the comparative example, near the fuel discharge port, the temperature was 55 to 60° C., which means sufficient electricity was generated, but in a peripheral portion, the temperature was 30° C., and from the comparison of this temperature with the room temperature (25° C.), this indicates that the heat generation quantity is very small. The temperature depends on the heat generation accompanying the electricity generation. Therefore, that some part has a low temperature means that the electricity generation is not promoted in this part. In the comparative example 1, it is indicated that the electricity generation takes place near the fuel discharge port but the electricity generation is not promoted near the peripheral portion. In the example 1 having the fuel distributing mechanism 3, since the temperature is 45 to 50° C. in the whole area, it can be inferred that the whole MEA contributed to the electricity generation, resulting in a high average output of the electricity generation.

The fuel distributing mechanism 3 used in the example 1 distributes the fuel from the hollow portion 24 provided therein to the plural fuel discharge ports 22. Therefore, strictly speaking, a phenomenon that the temperature near the fuel injection port is slightly high and the temperature decreases at a portion on a farther side is observed. Further, when the fuel cell 1 is inclined, there is observed a tendency that the temperature distribution changes depending on a direction of the inclination due to the influence of gravity and the like and the reaction on a lower portion becomes strong. Practically, sufficient performance can be obtained in this structure, but in order to more improve the output, it is preferable to use the fuel distributing mechanism 3 in which the fuel injection port 21 and the plural fuel discharge ports 22 are connected by a thin tube 25 as shown in FIG. 3 and FIG. 4.

Figure 3:
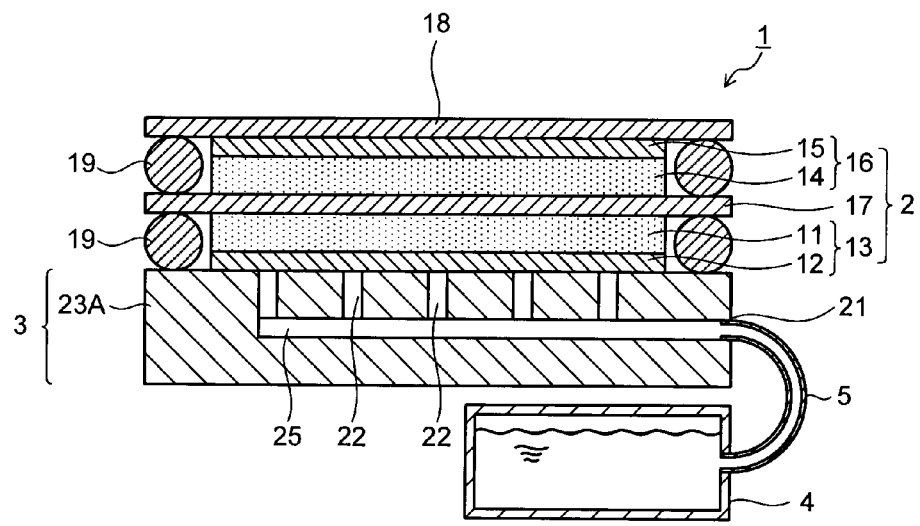
FIG. 3 is a cross-sectional view showing a modification example of the fuel cell shown in FIG. 1.
Figure 4:
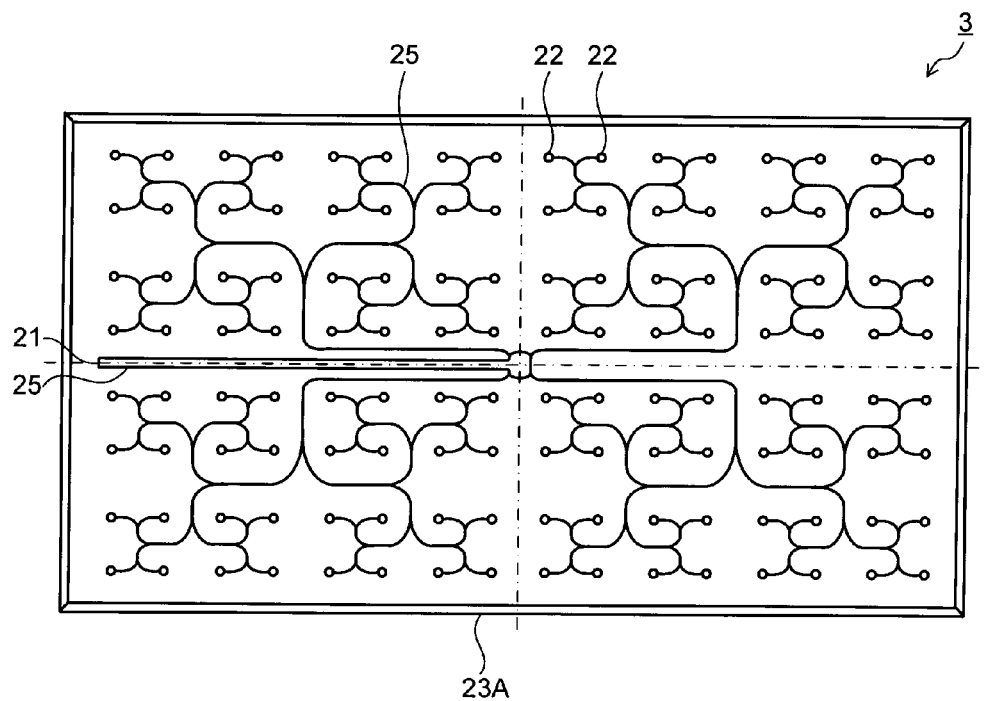
FIG. 4 is a plane view showing the structure of a fuel distributing mechanism used in the fuel cell shown in FIG. 3.

The fuel distributing mechanism 3 shown in FIG. 3 and FIG. 4 includes a fuel distributing plate 23A having: at least one fuel injection port 21 into which the liquid fuel flows; and the plural fuel discharge ports 22 from which the liquid fuel or its vaporized components are discharged. Inside the fuel distributing plate 23A, the thin tube 25 functioning as a passage of the liquid fuel is formed. At one end (starting end portion) of the thin tube 25, the fuel injection port 21 is provided. The thin tube 25 branches off in the middle into a plurality of thin tubes, and at end portions of the respective branched thin tubes 25, the fuel discharge ports 22 are provided respectively. The thin tube 25 is preferably a through hole with a 0.05 to 5 mm inside diameter, for instance. A sectional area (opening area) of each of the fuel discharge ports 22 is preferably set so that the total sectional area of the fuel discharge ports 22 is 5% or less of an area of the fuel distributing plate 23A.

The liquid fuel led into the fuel distributing plate 23A from the fuel injection port 21 is led to the plural fuel discharge ports 22 via the plural branched thin tubes 25. The fuel distributing mechanism 3 (fuel distributing plate 23A) shown in FIG. 3 and FIG. 4 has the same structure as that of the fuel distributing mechanism 3 shown in FIG. 1 except that the thin tube 25 is used as its internal fuel passage. The use of the fuel distributing mechanism 3 with such a structure makes it possible to equally distribute the liquid fuel which is injected from the fuel injection port 21 into the fuel distributing mechanism 3, to the plural fuel discharge ports 22 irrespective of the direction and the position. Therefore, it is possible to further enhance uniformity of the electricity generation reaction in the surface of the fuel cell unit 2.

Further, the structure in which the fuel injection port 21 and the plural fuel discharge ports 22 are connected by the thin tube 25 allows such a design that a larger amount of the fuel is supplied to a specific place of the fuel cell 1. For example, when heat release of a half of the fuel cell 1 becomes high because of the way the device is mounted, the conventional art cannot avoid a decrease in the average output because the temperature distribution occurs. On the other hand, by adjusting a formation pattern of the thin tube 25 to densely dispose the fuel discharge ports 22 at a part with high heat release in advance, it is possible to increase the heat generation accompanying the electricity generation at this part. This can make a degree of the electricity generation uniform in the surface, which makes it possible to prevent the decrease in the output.

The thin tube 25 provided inside the fuel distributing plate 23A has the branching points as described above, and sequentially branches off at the branching points toward the plural fuel discharge ports 22 from the fuel injection port 21. It is preferable to set a sectional area of each of the thin tubes after the branching equal to or less than a sectional area of the thin tube before the branching so that a pressure loss at each of the branching points is reduced. In the thin tube 25 shown in FIG. 5 to FIG. 7, a thin tube 25A connected to the fuel injection port 21 branches off at a first branching point 26a into four thin tubes 25B1, 25B2, 25B3, 25B4, and further the thin tube 25B after the branching branches off at a second branching point 26b into four thin tubes 25C1, 25C2, 25C3, 25C4, and the fuel discharge ports 22 are provided at end portions of the thin tubes 25C1, 25C2, 25C3, 25C4 respectively.

Figure 5:
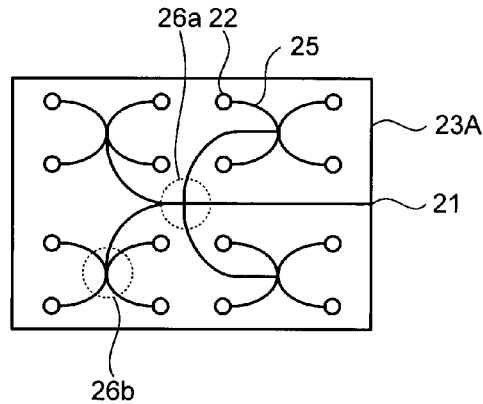
FIG. 5 is a view illustrating a branch structure of a thin tube in the fuel distributing mechanism shown in FIG. 4.
Figure 6:
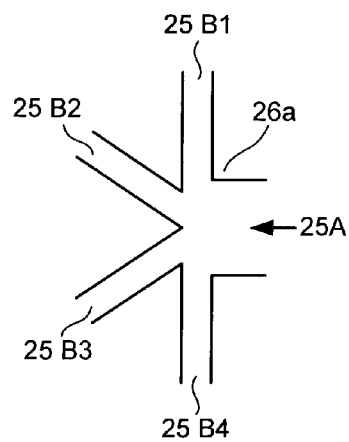
FIG. 6 is a view showing a first branching point of the thin tube in the fuel distributing mechanism shown in FIG. 5.
Figure 7:
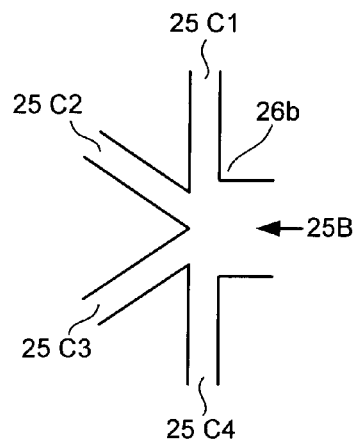
FIG. 7 is a view showing a second branching point of the thin tube in the fuel distributing mechanism shown in FIG. 5.

When the branch structure shown in FIG. 5 to FIG. 7 is adopted, it is preferable to set the sectional area of each of the thin tubes 25 so that the first branching point 26a satisfies A≧B, where A is the sectional area of the thin tube 25A before the branching at the first branching point 26a, and B (=B1+B2+B3+B4) is the sum of the sectional areas B1, B2, B3, B4 of the thin tubes 25B1, 25B2, 25B3, 25B4 after the branching. Similarly, it is preferable to set the sectional area of each of the thin tubes 25 so that the second branching point 26b satisfies B≧C, where B is the sectional area of the thin tube 25B before the branching and C (=C1+C2+C3+C4) is the total sectional area of the thin tubes 25C1, 25C2, 25C3, 25C4 after the branching.

As described above, by setting the total sectional area of the thin tubes 25 after the branching at the branching point 26 equal to or smaller than the sectional area of the thin tube 25 before the branching, it is possible to reduce the pressure loss at the branching point 26. Such a branching condition is preferably applied to each of the branching points 26 regardless of the number of times the thin tube 25 branches off. Reducing the pressure loss at the branching point 26 makes it possible to make fuel discharge amounts from the plural fuel discharge ports 22 more uniform. Further, the sectional area (opening area) of each of the fuel discharge ports 22 is preferably equal to or larger than the sectional area of the thin tube 25 connected thereto. This enables further enhancement in the uniformity of the electricity generation reaction in the surface of the fuel cell unit 2.

As an example 2 of the first embodiment, a fuel cell 1 employing the fuel distributing mechanism shown in FIG. 3 and FIG. 4 was fabricated. The fuel cell 1 had the same structure as that of the example 1 except that the fuel distributing mechanism 3 having the thin tube 25 with an about 0.1 mm inside diameter was used. In the fuel cell of the example 2, a 23 mW/cm$^2$ average output was obtained, and it was observed that temperature distribution did not depend on the position and the direction. By thus using the thin tube 25 which branches off into the plural thin tubes as the fuel passage in the fuel distributing mechanism 3, it is possible to make the fuel supply amounts more uniform, resulting in improvement in the output.

Figure 8:
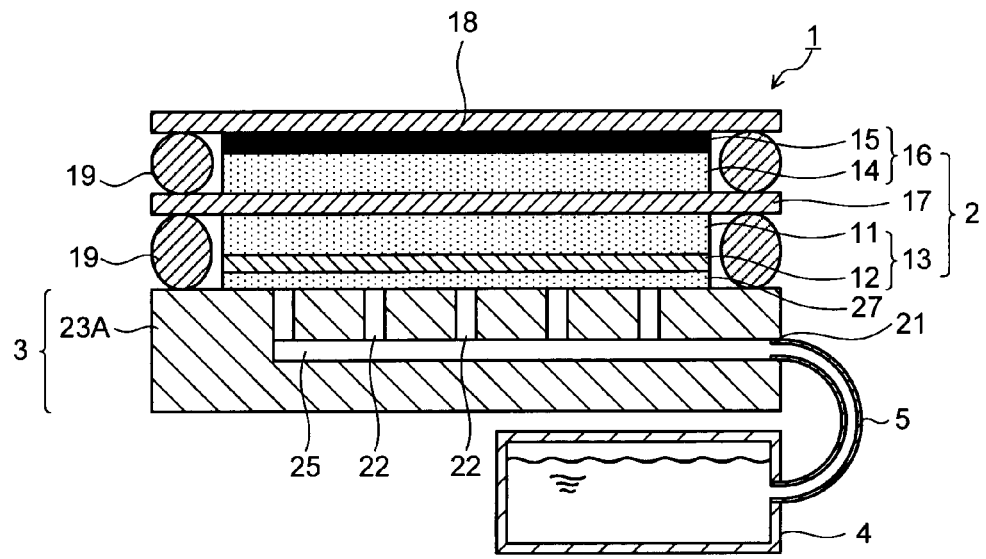
FIG. 8 is across-sectional view showing another modification example of the fuel cell shown in FIG. 1.

It is effective to insert a porous body 27 between the fuel distributing mechanism 3 and the anode (fuel electrode) 13 as shown in FIG. 8. As a constituent material of the porous body 27, any of various kinds of resin is used, and a porous resin sheet (polyethylene foam sheet, polyurethane foam sheet, or the like), resin nonwoven fabric, resin woven fabric, or the like is used as the porous body 27. Disposing the porous body 27 makes it possible to further average the fuel supply amounts to the fuel electrode 13. The liquid fuel jetted from the fuel discharge ports 22 of the fuel distributing mechanism 3 is once absorbed by the porous body 27 to diffuse in an in-plane direction inside the porous body 27. Since the fuel is thereafter supplied from the porous body 27 to the fuel electrode 13, it is possible to further average the fuel supply amounts. As the porous body 27, a stack of a plurality of porous films may be disposed.

As an example 3 of the first embodiment, a fuel cell 1 employing the porous body 27 shown in FIG. 8 was fabricated. As the porous body 27, a polyethylene porous body with a 1 mm thickness was used. The fuel cell 1 was fabricated with the same structure as that of the example 2 except that the porous body 27 was disposed. When methanol with a 90% concentration was supplied to the fuel cell of the example 3, an average output increased to 25 mW/cm$^2$ which is higher than that of the example 2 by 2 mW/cm$^2$. Further, as a result of temperature observation by a thermoviewer which was conducted at the same time, it was confirmed that the temperature distribution was 48 to 50° C. and thus more averaging was achieved than in the example 1.

In the above-described first embodiment, the mechanism delivering the liquid fuel from the fuel storage unit 4 to the fuel distributing mechanism 3 is not specifically limited. For example, when an installation place at the time of the use is fixed, it is possible to deliver the liquid fuel by dropping the liquid fuel from the fuel storage unit 4 to the fuel distributing mechanism 3 by utilizing gravity. Alternatively, using the flow path 5 filled with a porous body or the like makes it possible to deliver the liquid fuel from the fuel storage unit 4 to the fuel distributing mechanism 3 by a capillary action. Further alternatively, a pump may be used to deliver the liquid fuel from the fuel storage unit 4 to the fuel distributing mechanism 3.

Figure 9:
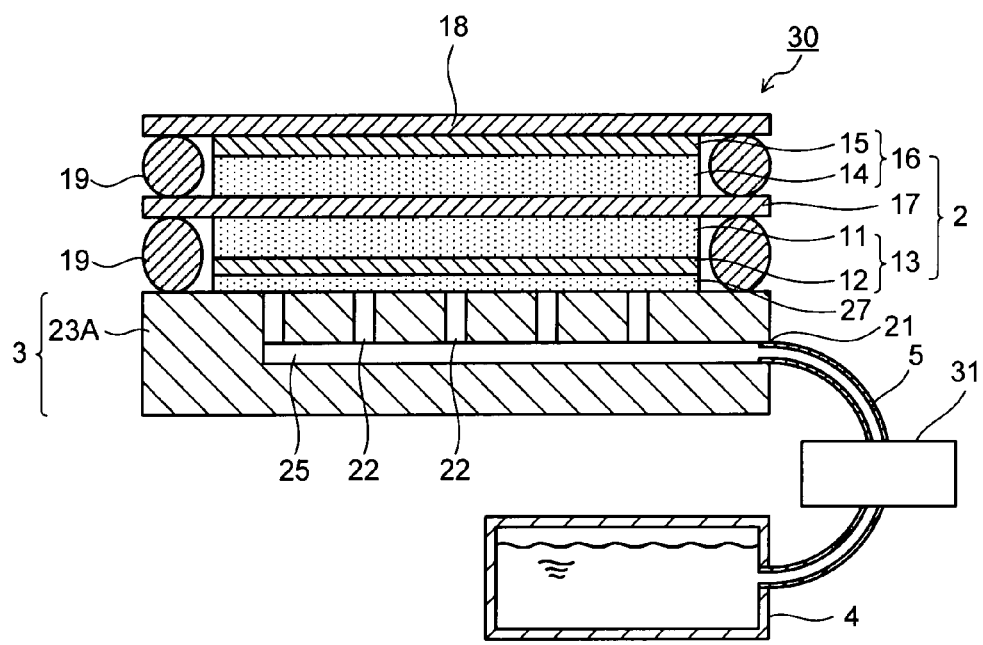
FIG. 9 is a cross-sectional view showing the structure of a fuel cell according to a second embodiment of the present invention.

Next, a fuel cell in which a pump is inserted between the fuel storage unit 4 and the fuel distributing mechanism 3 will be described as a second embodiment of the present invention with reference to FIG. 9 to FIG. 18. A fuel cell 30 shown in FIG. 9 is structured such that a pump 31 is inserted in the middle of the flow path 5 of the fuel cell 1 shown in FIG. 8. The other structure is the same as that of the fuel cell 1 shown in FIG. 8. That is, the pump 31 is not a circulating pump circulating a fuel, but is only a fuel supply pump delivering the liquid fuel from the fuel storage unit 4 to the fuel distributing mechanism 3. Delivering the liquid fuel by such a pump 31 when necessary makes it possible to enhance controllability of a fuel supply amount.

In the fuel cell 30 shown in FIG. 9, the fuel supplied to a fuel cell unit 2 from the fuel distributing mechanism 3 is used for the electricity generation reaction, and thereafter is not circulated and returned to the fuel storage unit 4. Not circulating the fuel, the fuel cell 30 shown in FIG. 9 is different from a conventional active type, and does not hinder the miniaturization and the like of the device. Further, the fuel cell 30 uses the pump 31 for the supply of the liquid fuel and is different from a pure passive type such as a conventional internal vaporization type. The fuel cell 30 shown in FIG. 9 is one employing a method called, for example, a semi-passive type.

The kind of the pump 31 is not specifically limited, but it is preferable to use a rotary vane pump, an electroosmosis flow pump, a diaphragm pump, a squeeze pump, or the like, in view of that they can deliver a small amount of a liquid fuel with high controllability and can be reduced in size and weight. The rotary vane pump delivers a liquid by rotating its vanes by a motor. The electroosmosis flow pump uses a sintered porous body such as silica causing an electroosmosis flow phenomenon. The diaphragm pump delivers a liquid by driving its diaphragm by an electromagnet or piezoelectric ceramics. The squeeze pump puts pressure on part of a fuel flow path having flexibility to squeeze and deliver the fuel. Among them, the use of the electroosmosis flow pump or the diaphragm pump having the piezoelectric ceramics is more preferable in view of driving power, size, and the like.

Since a main target of the fuel cell 1 is a small electronic device, liquid delivery capability of the pump 31 is preferably within a range from 10 μL/minute to 1 mL/minute. When the liquid delivery capability is over 1 mL/minute, an amount of the liquid fuel delivered at a time becomes too large, and hence a ratio of the non-operation period of the pump 31 in the total operation period becomes long. Accordingly, the supply amount of the fuel to the fuel cell unit (MEA) 2 greatly fluctuates, resulting in great fluctuation in an output. A reservoir may be provided between the pump 31 and the fuel distributing mechanism 3 in order to prevent the fluctuation in the output, but even the adoption of such a structure cannot fully reduce the fluctuation in the fuel supply amount, and further leads to the upsizing and the like of the device.

On the other hand, when the liquid delivery capability of the pump 31 is below 10 μL/minute, supply capability may possibly be insufficient at the time when a consumption amount of the fuel increases, such as the start-up time of the device. Consequently, an activation characteristic and the like of the fuel cell 30 deteriorate. In light of these, it is preferable to use the pump 31 whose liquid delivery capability is within the range from 10 μL/minute to 1 mL/minute. The liquid delivery capability of the pump 31 is more preferably within a range from 10 to 200 μL/minute. In order to realize such a liquid delivery amount stably, it is also preferable to use an electroosmosis flow pump or a diaphragm pump as the pump 31.

In the fuel cell 30 shown in FIG. 9, when necessary, the pump 31 is operated to supply the liquid fuel from the fuel storage unit 4 to the fuel distributing mechanism 3. The liquid fuel led into the fuel distributing mechanism 3 is led to each of a plurality of fuel discharge ports 22 as in the above-described first embodiment. Then, the fuel is supplied from the plural fuel discharge ports 22 to the whole surface of the fuel cell unit 2 to cause an electricity generation reaction. The fuel distributing mechanism 3 functions effectively also when the liquid fuel is thus delivered to the fuel storage unit 4 to the fuel distributing mechanism 3 by the pump 31. Therefore, it is possible to make the fuel supply amount to the fuel cell unit 2 uniform.

Figure 10:
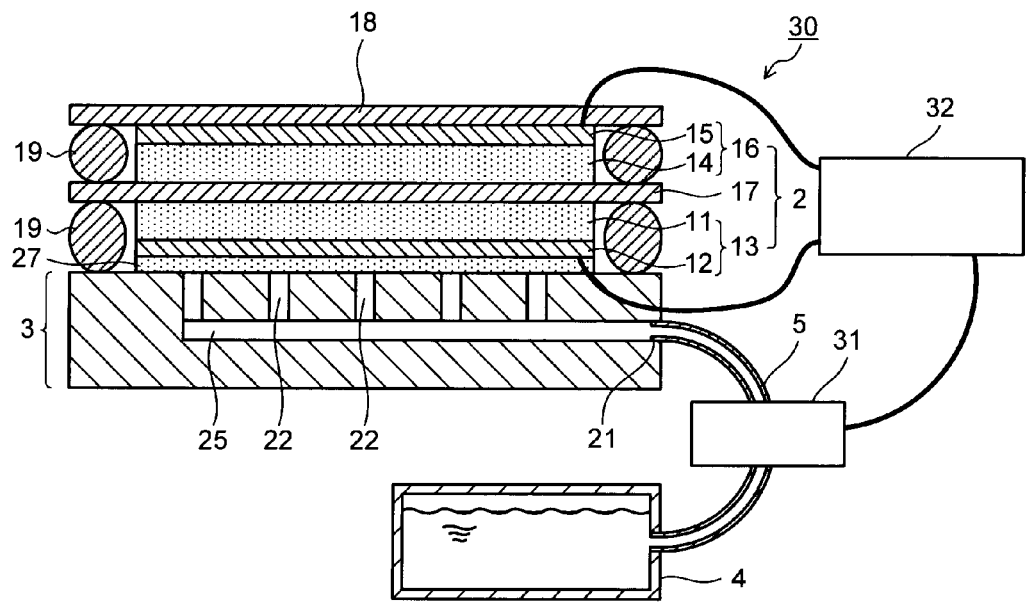
FIG. 10 is a view showing a state where an output control circuit is installed in the fuel cell shown in FIG. 9.

It is preferable to control the pump 31 for fuel supply (for liquid delivery) by referring to the output of the fuel cell 30 as shown in FIG. 10, for instance. In FIG. 10, the output of the fuel cell 30 is detected by a control circuit 32, and a control signal is sent to the pump 31 based on the detection result. ON/OFF of the pump 31 is controlled based on the control signal sent from the control circuit 32. By controlling the operation of the pump 31 not only based on the output of the fuel cell 30 but also based on temperature information, operation information of the electronic device being a power supply destination, and the like, it is possible to achieve a more stable operation.

A possible concrete example of the method of controlling the operation of the pump 31 may be a method in which the pump 31 is stopped or a liquid delivery amount is decreased when the output from the fuel cell 30 becomes higher than a certain prescribed value, and the operation of the pump 31 is resumed or the liquid delivery amount is increased when the output becomes lower than the prescribed value. Another possible method of the operation control may be a method in which the operation of the pump 31 is stopped or the liquid delivery amount is decreased when a rate of change of the output from the fuel cell 30 is plus, and the operation of the pump 31 is resumed or the liquid delivery amount is increased when the rate of change of the output becomes minus.

Figure 11:
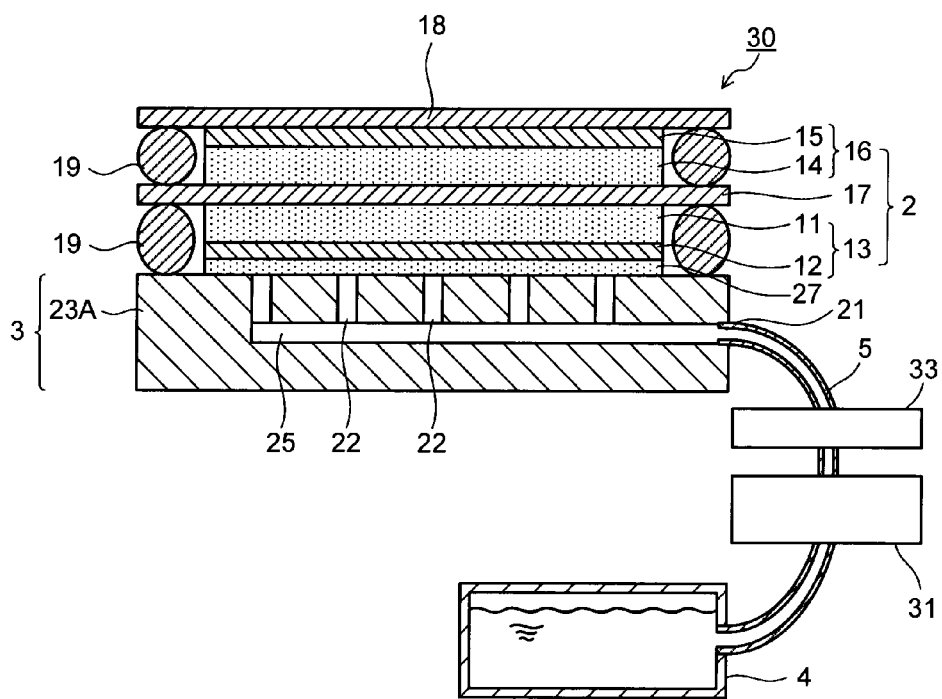
FIG. 11 is a view showing a state where a fuel shut-off valve is installed in the fuel cell shown in FIG. 9.

Further, in order to enhance stability and reliability of the fuel cell 30, a fuel shut-off valve 33 is preferably disposed in series with the pump 31 as shown in FIG. 11. FIG. 11 shows a structure where the fuel shut-off valve 33 is inserted in the flow path 5 between the pump 31 and the fuel distributing mechanism 3. The fuel shut-off valve 33 may be installed between the pump 31 and the fuel storage unit 4, which causes no functional problem.

However, the structure in which the fuel shut-off valve 33 is installed in the flow path 5 between the pump 31 and the fuel storage unit 4 may possibly cause a trouble in a function of sucking the liquid fuel out of the fuel storage unit 4 if the fuel in the pump 31 vaporizes, for example, when the fuel is stored for a long period. In light of this, the fuel shut-off valve 33 is preferably installed in the flow path 5 between the pump 31 and the fuel distributing mechanism 3, thereby preventing the vaporization of the liquid fuel from the pump 31, for example, when the fuel is stored for a long period.

By thus inserting the fuel shut-off valve 33 between the fuel storage unit 4 and the fuel distributing mechanism 3, the consumption of a trace amount of the fuel which unavoidably occurs even when the fuel cell 30 is not in use, the aforethe suction failure when the operation of the pump is resumed, and so on can be avoided. These advantages greatly contribute to improvement in practical convenience of the fuel cell 30.

Figure 12:
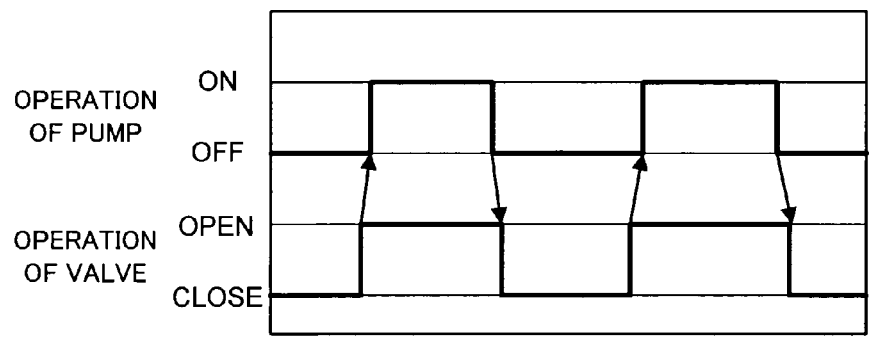
FIG. 12 is a chart showing a driving operation of a pump in the fuel cell shown in FIG. 9.

Setting the operation timing of the fuel shut-off valve 33 simultaneous with the driving timing of the pump 31 causes no practical problem, but it is preferable to open the valve 33 immediately before the operation of the pump 31 and close the valve 33 after the operation of the pump 31 is stopped as shown in FIG. 12, for instance. If, conversely, the valve 33 is opened simultaneously with or after the operation of the pump, and the valve 33 is closed before the pump is stopped, an internal pressure of the pump 33 increases, causing a suction failure and the like of the pump 33.

Figure 13A:
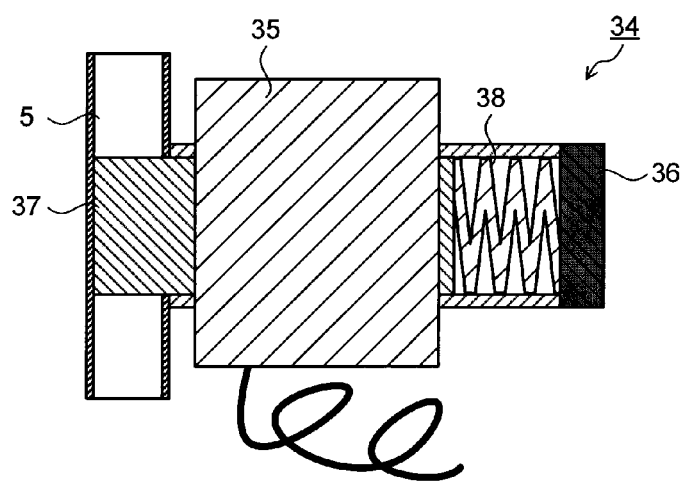
FIG. 13 A is a cross-sectional view showing a structure example of the fuel shut-off valve (closed state) employed in the fuel cell shown in FIG. 9.
FIG. 13B is a cross-sectional view showing an open state of the fuel shut-off valve shown in FIG. 13A.
Figure 13B:
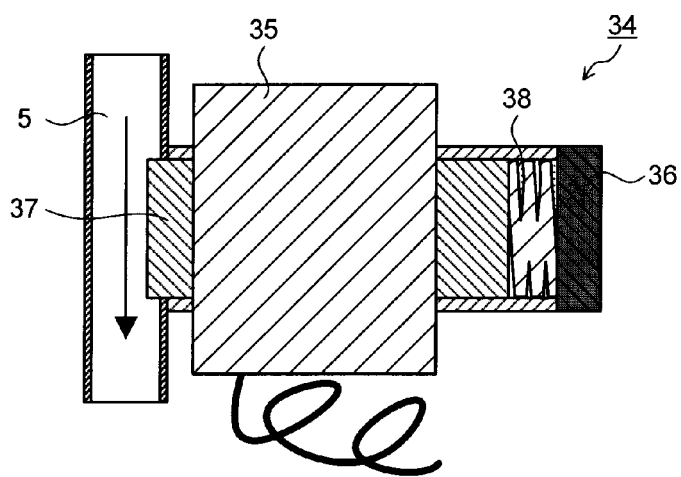
Figure 14:
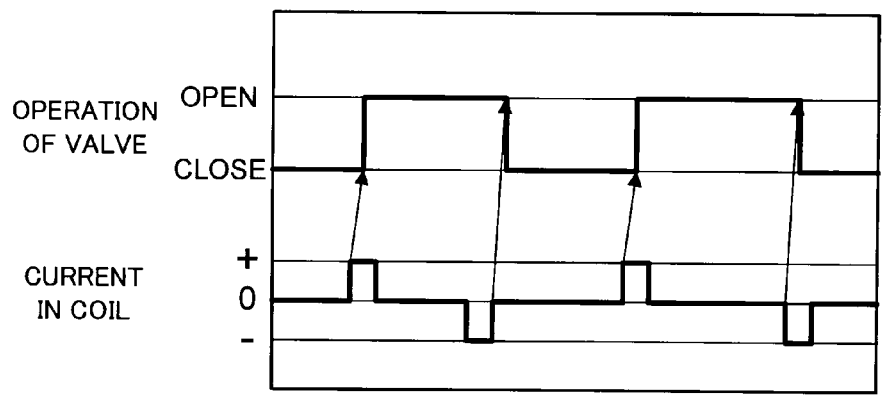
FIG. 14 is a chart showing a method of a driving operation of the fuel shut-off valve shown in FIG. 13.

As the fuel shut-off valve 33, used is an electrically driven valve which uses, as its actuator, an electromagnetic, a motor, a shape memory alloy, a piezoelectric ceramics, a bimetal, or the like and whose opening/closing operation can be controlled by an electric signal. As the fuel shut-off valve 33, the electrically driven valve using the electromagnet or the piezoelectric ceramics is preferably used in view of its size, driving power, and the like. Further, as the fuel shut-off valve 33, a latch-type valve having a state maintaining function is preferably used. FIG. 13 show an example of a latch valve 34 composed of the combination of an electromagnet and a permanent magnet. FIG. 13A shows a closed state of the latch valve 34 and FIG. 13B shows an open state of the latch valve 34. FIG. 14 shows the operation timing of the latch valve 34.

In the latch valve 34, a current is passed through a coil 35 in a direction so that a magnetic pole repelling the state maintaining magnet 36 is generated, and accordingly a movable core 37 repels the state maintaining magnet 36 to move in a direction so that the valve is brought into the closed state (left direction in the drawing). Even after electricity of the coil 35 is shut off, the closed state of the latch valve 34 is maintained by a spring 38. In order to open the latch valve 34, a current is passed through the coil 35 in a reverse direction to the direction in which the current is passed at the time of the closing operation, so that the movable core 37 is attracted to the state maintaining magnet 36 to move in a direction so that the valve is brought into an open state (right direction in the drawing). Even after the electricity of the coil 35 is shut off, the open state of the latch valve 34 is maintained since the movable core 37 is attracted to the state maintaining magnet 36.

Since a valve with the state maintaining function (for example, the latch valve 34) to which driving power is applied only when the opening/closing state is changed as described above is employed as the fuel shut-off valve 33, there is an advantages that it is possible to prevent a loss of power necessary for the valve operation, and maintain the state of the fuel shut-off valve 33 even if the power supply is interrupted due to an operation abnormality or the like. The fuel shut-off valve 33 has effects of not only avoiding the consumption of a trace amount of the fuel which occurs when the fuel cell 30 is not in use, the suction failure when the operation of the pump is resumed, and the like but also shutting-off the passage of a trace amount of the liquid fuel during the non-operation period of the pump 31 to further enhance output controllability of the fuel cell 30.

The fuel shut-off valve 33 is also effective for the fuel cell 1 of the first embodiment previously described. For example, in the fuel cells 1 shown in FIG. 1, FIG. 3, and FIG. 5, the fuel shut-off valve 33 is inserted in the flow path 5 connecting the fuel distributing mechanism 3 and the fuel storage unit 4. Adopting such a structure makes it possible to control the supply of the fuel to the fuel cell unit 2 to enhance output controllability of the fuel cell 1. The operation of the fuel shut-off valve 33 in this case can be controlled in the same manner as when the operation of the above-described pump 31 is controlled.

Figure 15:
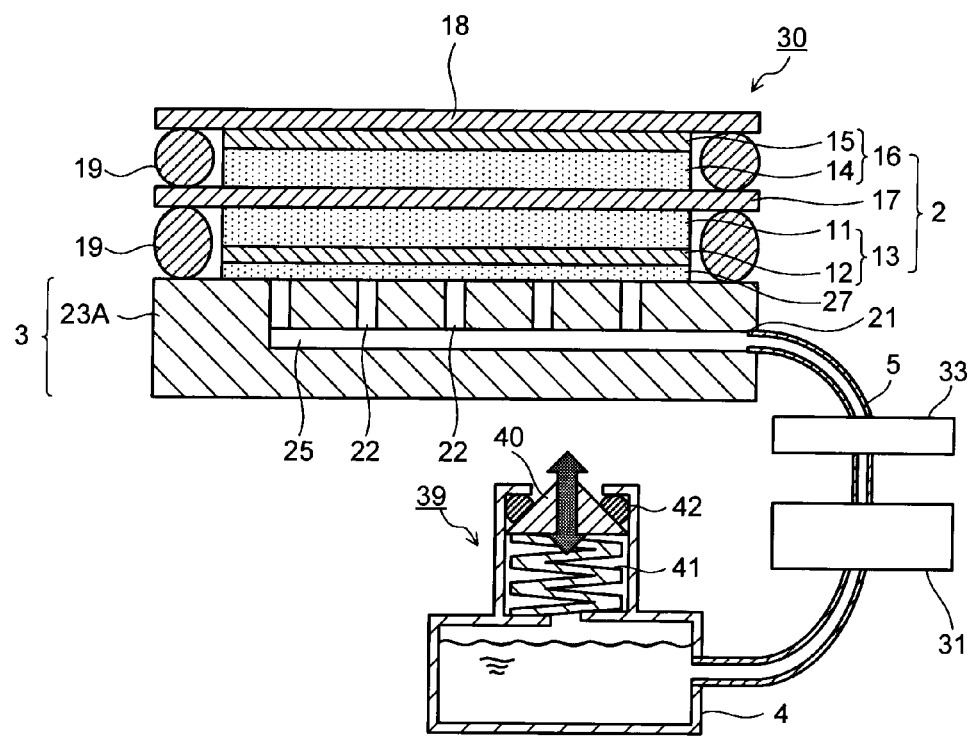
FIG. 15 is a view showing a state where a balance valve is installed in the fuel cell shown in FIG. 11.

In the fuel cell 30 of the second embodiment, a balance valve for balancing a pressure in the fuel storage unit 4 and the outside air is preferably mounted in the fuel storage unit 4 or the flow path 5. FIG. 15 shows a state where a balance valve 39 is installed in the fuel storage unit 4. The balance valve 39 has a spring 41 which operates a valve movable piece 40 according to the pressure in the fuel storage unit 4 and a sealing part 42 which seals the valve movable piece 40 to produce the closed state.

When the internal pressure of the fuel storage unit 4 is in a reduced state after the liquid fuel is supplied from the fuel storage unit 4 to the fuel distributing mechanism 3, the valve movable piece 40 of the balance valve 39 receives an external pressure to overcome a repulsive force of the spring 41, so that the sealing part 42 is opened. Based on this open state of the balance valve 39, the outside air is led in so as to reduce a difference between the internal and external pressures. When the difference between the internal and external pressures is eliminated, the valve movable piece 40 moves again to airtightly close the sealing part 42.

Installing thus operating balance valve 39 in the fuel storage unit 4 or the like makes it possible to inhibit fluctuation in the liquid delivery amount ascribable to the decrease in the internal pressure of the fuel storage unit 4 accompanying the supply of the liquid fuel. That is, when the inside of the fuel storage unit 4 becomes in the pressure-reduced state, the suction of the liquid fuel by the pump 31 becomes unstable, which is likely to fluctuate the liquid delivery amount. Such fluctuation in the liquid delivery amount can be solved by the installation of the balance valve 39. Therefore, operation stability of the fuel cell 30 can be improved. Incidentally, when the balance valve 39 is installed in the flow path 5, the balance valve 39 is preferably inserted between the fuel storage unit 4 and the pump 31.

Figure 16:
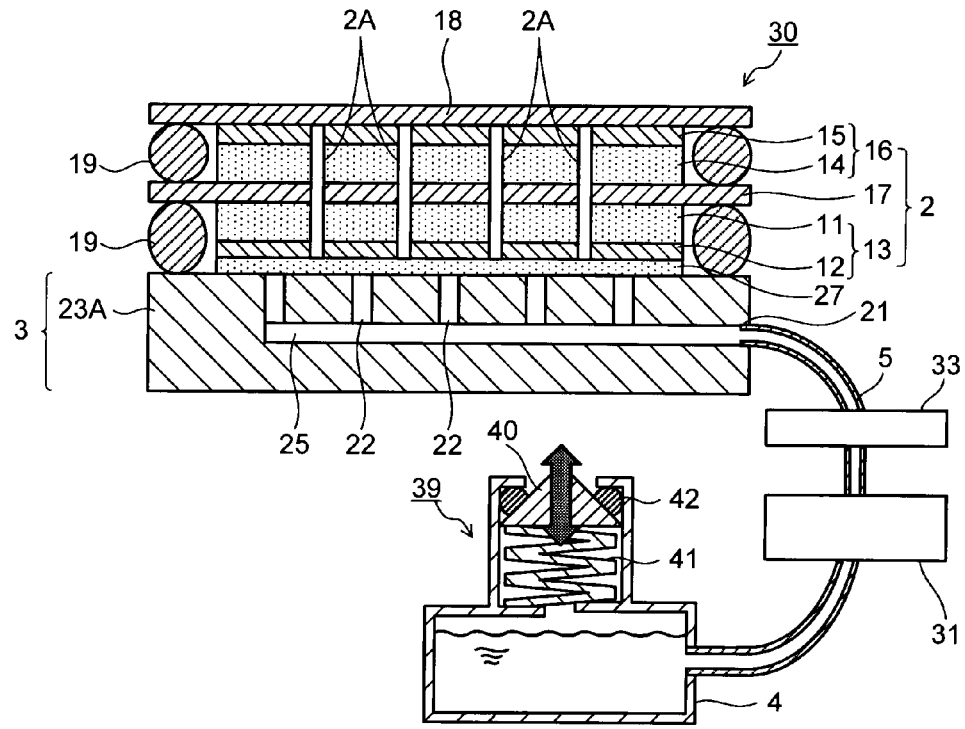
FIG. 16 is a view showing a state where gas vent holes are provided in a fuel cell unit in the fuel cell shown in FIG. 15.

Further, when the pump 31 is provided as in the fuel cell 30 of the second embodiment, it is preferable to not only provide the balance valve 39 in the fuel storage unit 4 or the like but also provide, in the fuel cell unit 2, gas vent holes 2A passing through the fuel cell unit 2 in, for example, its stack direction as shown in FIG. 16.

By installing the balance valve 39 in the fuel storage unit 4 or the flow path 5 as described above, it is possible to inhibit the decrease in the internal pressure of the fuel storage unit 4 accompanying the supply of the liquid fuel, whereby the suction of the liquid fuel by the pump 31 can be stabilized. However, on an anode 13 side of the fuel cell unit 2, gas components such as carbon dioxide and water vapor are generated due to the internal reforming reaction of methanol as shown by, for example, the above expression (1), and accordingly, an internal pressure of the fuel distributing mechanism 3, concretely, an internal pressure of the thin tube 25 and so on of the fuel distributing plate 23A increases, which sometimes makes it difficult to delivery the liquid fuel by the pump 31.

Therefore, by providing the gas vent holes 2A in the fuel cell unit 2, it is possible to discharge the generated gas components from the anode 13 side of the fuel cell unit 2 to its cathode 16 side and further to discharge the gas components to the outside of the fuel cell 30, which as a result can reduce the internal pressure of the fuel distributing mechanism 3 to facilitate the delivery of the liquid fuel by the pump 31. That is, by providing the balance valve 39 in the fuel storage unit 4 or the like and providing the gas vent holes 2A in the fuel cell unit 2, it is possible to facilitate both the suction and pushing of the liquid fuel by the pump 31.

An example of each of the gas vent holes 2A is a through hole passing all through the fuel cell unit 2 in the stack direction, and when, for example, the anode 13 and the cathode 16 are porous bodies and thus are capable of effectively allowing the permeation of the gas components, the gas vent holes 2A may be through holes passing through only the electrolyte membrane 17 which is a portion allowing substantially no permeation of the gas components.

The shape and size of the gas vent holes 2A are not necessarily limited, but a preferable example thereof is circular holes whose diameter is not less than 0.05 mm nor greater than 1.0 mm. When the diameter is less than 0.05 mm, the gas components are not likely to be fully discharged from the anode 13 side to the cathode 16 side, and when the diameter is over 1.0 mm, the direct permeation of the fuel is likely to occur and an effective area contributing to the electricity generation is also reduced, which may possibly lower the output.

The number of the gas vent holes 2A is preferably, for example, about one per an area of not less than 1 $cm^2$ nor greater than 15 $cm^2$ of the fuel cell unit 2, though depending on the shape and size of the gas vent holes 2A or a planer shape or the like of the fuel cell unit 2. When the number of the gas vent holes 2A is about one per an area of less than 1 $cm^2$, the number of the gas vent holes 2A per the area is too large, which may possibly cause the direct permeation of the fuel and lower the output due to the decrease in the effective area contributing to the electricity generation, and when the number is about one per an area over 15 $cm^2$, the number of the gas vent holes 2A per the area is too small, which may possibly prevent the full discharge of the gas components from the anode 13 side to the cathode 16 side.

In the fuel cell 30 thus having the pump 31, the balance valve 39 provided in the fuel storage unit 4 or the like, and the gas vent holes 2A provided in the fuel cell unit 2, it is preferable that a liquid delivery pressure from the pump 31 to the fuel distributing mechanism 3 is 5 kPa or higher. When the liquid delivery pressure from the pump 31 to the fuel distributing mechanism 3 is lower than 5 kPa, the liquid fuel is not uniformly supplied to the fuel distributing mechanism 3, that is, to the thin tubes 25 of the fuel distributing plate 23A and to the fuel discharge ports 22, resulting in an uneven electricity generation reaction in the fuel cell unit 2, which may possibly lower electricity generation efficiency. Further, when the liquid delivery pressure from the pump 31 to the fuel distributing mechanism 3 is lower than 5 kPa, a liquid delivery amount (supply amount) itself of the liquid fuel is decreased, which may possibly result in a great decrease in the output.

A more preferable liquid delivery pressure from the pump 31 to the fuel distributing mechanism 3 is 10 kPa or higher from the viewpoint of the uniform and sufficient supply of the liquid fuel to the fuel distributing mechanism 3, that is, to the thin tubes 25 of the fuel distributing plate 23A and to the fuel discharge ports 22. It should be noted that an upper limit of the liquid delivery pressure from the pump 31 to the fuel distributing mechanism 3, though not necessarily limited, is generally about 100 kPa since a liquid delivery pressure of the pump 31 used for this type is generally up to about 100 kPa.

Here, the liquid delivery pressure from the pump 31 to the fuel distributing mechanism 3 is measured near the fuel distributing mechanism 3 side of the pump 31, and can be found from a flow rate measured by a flowmeter disposed in the flow path 5 connected to the fuel distributing mechanism 3 side of the pump 31, for instance. Incidentally, the operation and stop of the pump 31 are repeated as required as described above, and in such a case, the liquid delivery pressure from the pump 31 to the fuel distributing mechanism 3 while the pump 31 is in actual operation may be any, provided that it is equal to 5 kPa or higher as described above.

The liquid delivery pressure from the pump 31 to the fuel distributing mechanism 3 can be adjusted to 5 kPa or higher not only by the aforethe adjustment of the shape, size, number, and the like of the gas vent holes 2A in the fuel cell unit 2 but also by the adjustment of the pore size of each of the thin tubes 25 of the fuel distributing plate 23A constituting the fuel distributing mechanism 3 and the pore size of each of the fuel discharge ports 22, and the like, by the adjustment of an opening time (release pressure) of the balance valve 39 provided in the fuel storage unit 4 or the like, by the adjustment of the liquid delivery capability of the pump 31, and the like.

The opening time of the balance valve 39 can be adjusted by the adjustment of the repulsive force of the spring 41 pressing its valve movable piece 40 toward the sealing part 42, and for example, the repulsive force is adjusted so that the valve movable piece 40 separates from the sealing part 42 when the difference between the external pressure and the internal pressure of the fuel storage unit 4 or the like becomes 10 Pa or more. Further, the pump 31 needs to have liquid delivery capability so that its own liquid delivery pressure becomes 5 kPa or higher.

Next, a description will be given of electricity generation tests which were conducted regarding the second embodiment by using a fuel cell which had the pump 31 and the balance valve 39 and had the gas vent holes 2A provided in the fuel cell unit 2 and in which the liquid delivery pressure from the pump 31 to the fuel distributing mechanism 3 was set to 5 kPa or higher (example 4) and a fuel cell (comparative example 2) having the same structure as that of the example 4 except that the liquid delivery pressure from the pump 31 to the fuel distributing mechanism 3 was set to less than 5 kPa.

As the fuel cell 30 of the example 4, the following fuel cell was fabricated. A Pt—Ru-based catalyst layer was applied as the anode catalyst layer 11 on carbon paper as the anode gas diffusion layer 12, thereby forming the anode 13 with 10 mm×80 mm, and a Pt black catalyst layer as the cathode catalyst layer 14 was applied on carbon paper as the cathode gas diffusion layer 15, thereby forming the cathode 16 with 10 mm×80 mm, and totally four sets of unit cells each composed of a pair of these anode 13 and cathode 16 were fabricated.

Then, the anode 13 of each of the unit cells was disposed on one of main surfaces of a perfluoro surfonic acid film as the electrolyte membrane 17 so that the anode catalyst layer 11 came into contact with the electrolyte membrane 17, and the cathode 16 of each of the unit cells was disposed on the other main surface of the perfluoro surfonic acid film so that the cathode catalyst layer 14 came into contact with the electrolyte membrane 17. Then, they were joined by five-minute hot pressing under the condition of 20° C. and a 100 kg/cm² pressure, thereby forming an assembly with 40 mm×80 mm. Further, at a surface-direction center portion of each of the cells in the assembly, one through hole having a 0.2 mm pore diameter and passing through in the stack direction was formed as the gas vent hole 2A, thereby manufacturing a fuel cell unit 2 substantially the same as that shown in FIG. 16.

The structure of the fuel cell 30 except the fuel cell unit 2 was basically the same as that shown in FIG. 16, and the fuel storage unit 4 having the balance valve 39 and the fuel distributing mechanism 3 were connected via the flow path 5 having the pump 31, and the fuel cell unit 2 and so on were disposed on the fuel distributing mechanism 3. Incidentally, only the fuel distributing mechanism 3 was structured such that the fuel distributing plate 23 with the hollow portion 24 shown in FIG. 1 was formed in place of the fuel distributing plate 23A having the thin tube 25. The fuel discharge ports 22 of the fuel distributing plate 23 were arranged as shown in FIG. 2, and their pore diameters were set to 0.5 mm. Further, as the pump 31, a pump whose liquid delivery pressure to the fuel distributing mechanism 3 in the fuel cell 30 as structured above was 5 kPa or higher was used.

Then, methanol with a 90% concentration was injected as the liquid fuel to the fuel storage unit 4, and the pump 31 was intermittently operated to supply the methanol from the fuel storage unit 4 to the fuel distributing mechanism 3, thereby causing the electricity generation. Incidentally, the liquid delivery pressure from the pump 31 to the fuel distributing mechanism 3 during the operation of the pump 31 was 5 kPa or higher (30 kPa on average). The result of the electricity generation test (relation between electricity generation time and output density) of the fuel cell 30 of the example 4 is shown in FIG. 17.

Meanwhile, as the fuel cell 30 of the comparative example 2, manufactured was one that was the same as the fuel cell 30 of the example 4 except that the pump 31 whose liquid delivery pressure to the fuel distributing mechanism 3 was less than 5 kPa was used. Then, similarly to the fuel cell 30 of the example 4, the pump 31 was intermittently operated to supply methanol from the fuel storage unit 4 to the fuel distributing mechanism 3, thereby causing the electricity generation. Incidentally, the liquid delivery pressure from the pump 31 to the fuel distributing mechanism 3 during the operation of the pump 31 was less than 5 kPa (3 kPa on average). The result of the electricity generation test of the fuel cell 30 of the comparative example 2 (relation between the electricity generation time and output density) is also shown in FIG. 17.

Figure 17:
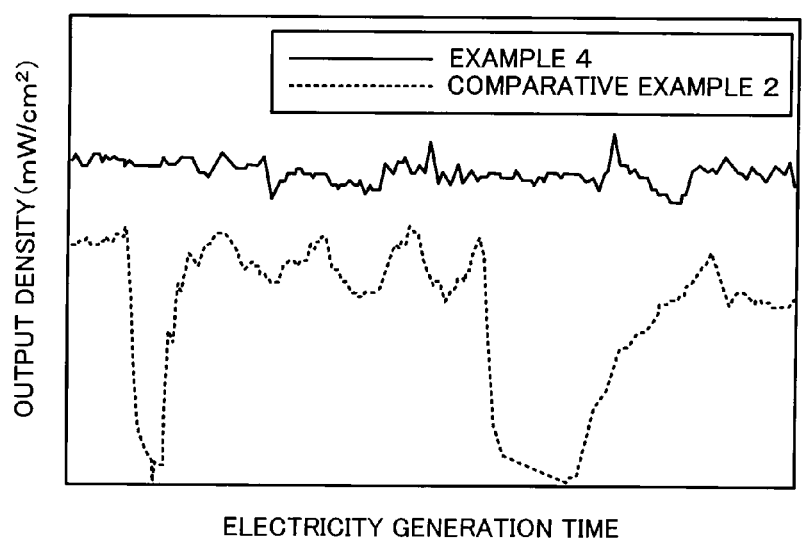
FIG. 17 is a chart showing a time-output density characteristic of a fuel cell according to an example of the present invention.

As is apparent from FIG. 17, regarding the fuel cell 30 of the example 4, slight periodic fluctuation due to the intermittent operation of the pump 31 is observed, but it is confirmed that the output density is kept substantially constant. On the other hand, regarding the fuel cell 30 of the comparative example 2, it is confirmed that the output density is low on the whole compared with that of the fuel cell 30 of the example 4 and temporarily decreases to a great extent.

It can be inferred that, in the fuel cell 30 of the comparative example 2, the reason for the decrease in the output density on the whole is because, due to the low liquid delivery pressure, specifically, lower than 5 kPa, from the pump 31 to the fuel distributing mechanism 3, the methanol is not uniformly supplied to the fuel distributing mechanism 3, that is, to the fuel discharge ports 22 of the fuel distributing plate 23, and as a result the electricity generation reaction in the fuel cell unit 2 becomes uneven. Further, it can be inferred that the reason for the temporary great decrease in the output density in the fuel cell 30 of the comparative example 2 is because, due to the low liquid delivery pressure, the supply amount itself of the methanol becomes insufficient.

Next, a fuel cell according to a third embodiment of the present invention will be described with reference to FIG. 18 and FIG. 19. A fuel cell 50 shown in FIG. 18 includes a fuel distributing mechanism 3 composed of a flow path plate having a fuel distributing groove and a diffusion plate having a plurality of fuel discharge ports. A fuel cell unit 2 is, for example, composed of a plurality of unit cells connected in series, and may further has gas vent holes releasing gas components such as carbon dioxide gas and water vapor generated on a fuel electrode side.

Figure 18:
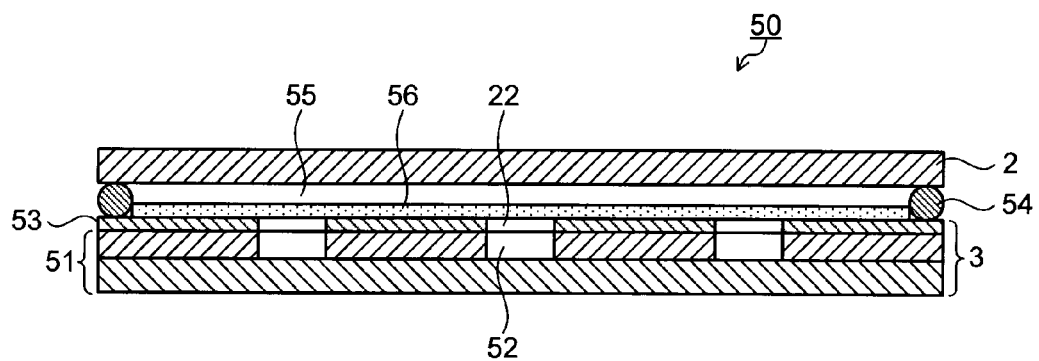
FIG. 18 is a cross-sectional view showing the structure of a fuel cell according to a third embodiment of the present invention.

Though the structure of the fuel cell unit (MEA) 2 is omitted in FIG. 18, a concrete structure of the fuel cell unit 2 is the same as that of the first and second embodiment previously described. Further, though a fuel storage unit, a flow path, a fuel supply pump, and so on are omitted in FIG. 18, the fuel cell 50 of the third embodiment includes these elements, and concrete structures of these elements are the same as those of the fuel cells 1, 30 of the first and second embodiments previously described.

The fuel distributing mechanism 3 according to the third embodiment will be described in detail. A flow path plate 51 constituting the fuel distributing mechanism 3 has a fuel distributing groove 52 functioning as a fuel passage. A starting end portion of the fuel distributing groove 52 serves as a fuel injection port 21. The fuel injection port 21 provided in the fuel distributing groove 52 is connected to the fuel storage unit via the not-shown flow path as in the first and second embodiments previously described. Further, the fuel supply pump, a fuel shut-off valve, and so on are provided in the flow path when necessary, as in the first and second embodiments.

The fuel distributing groove 52 branches off into a plurality of grooves near the fuel injection port 21 so as to enable quick spread of a small amount of a liquid fuel. The fuel distributing grooves 52 after the branching are formed so that the liquid fuel spreads in the whole fuel distributing mechanism 3 in a surface direction. On the flow path plate 51 having the fuel distributing groove 52, a diffusion plate 53 is disposed so as to cover openings of the fuel distributing grooves 52. The diffusion plate 53 has a plurality of fuel discharge ports 22 which are opened so as to be connected to the fuel distributing grooves 52. The fuel discharge ports 22 are formed so that the fuel can be uniformly supplied in the surface direction of the fuel cell unit 2. The number and so on of the fuel discharge ports 22 are preferably set equal to those of the embodiments previously described.

Between the fuel cell unit 2 and the fuel distributing mechanism 3, a sealing member such as an O-ring 54 is disposed, so that the leakage and the like of the fuel are prevented and a fuel diffusion space 55 is formed between the fuel cell unit 2 and the fuel distributing mechanism 3. The fuel diffusion space 55 enhances diffusibility of the fuel released from the fuel discharge ports 22. Further, by disposing a porous body 56 in a sheet form spreading the fuel in the surface direction on the diffusion plate 53, it is possible to two-dimensionally and uniformly diffuse the fuel released from the fuel discharge ports 22. The structure of the porous body 56 is the same as that described in the embodiments described above. The fuel diffusion space 55 is also effective in the first and second embodiments previously described.

To the fuel distributing mechanism 3 composed of the flow path plate 51 and the diffusion plate 53, a necessary amount of the liquid fuel for the electricity generation is intermittently delivered from the fuel storage unit via the flow path and the pump, as in the embodiment previously described. The liquid fuel led from the fuel injection port 21 passes in the fuel distributing groove 52 to quickly spread in the surface direction of the flow path plate 51. Then, the liquid fuel spreading in the fuel distributing groove 52 is uniformly diffused via the plural fuel discharge ports 22 provided in the diffusion plate 53. The diffusion state of the fuel is further made uniform in the fuel diffusion space 55 and the porous body 56. Therefore, the fuel can be uniformly supplied in the surface direction of the fuel cell unit 2, which enables enhanced uniformity of the electricity generation reaction in the surface of the fuel cell unit 2.

Figure 19:
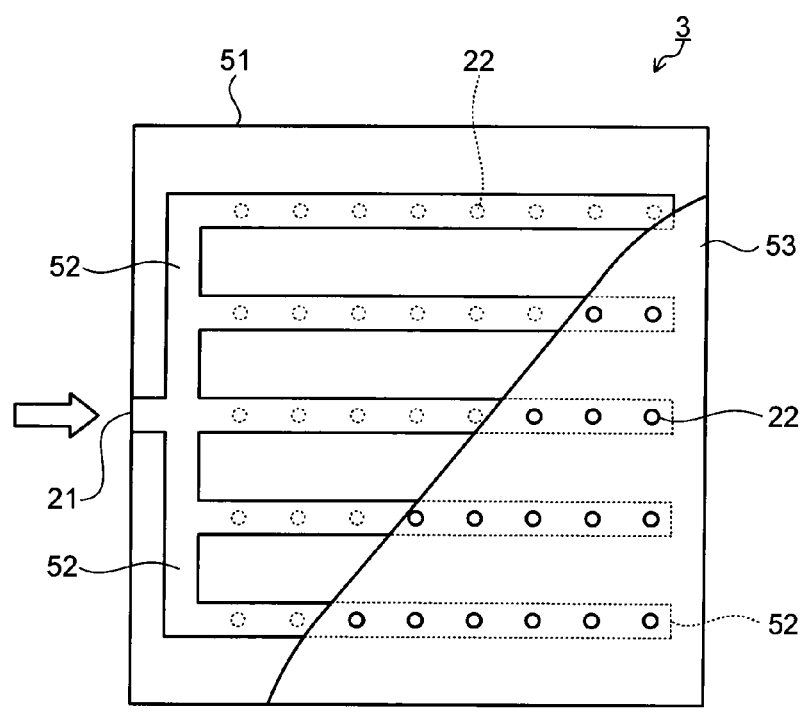
FIG. 19 is a view showing the structure of a fuel distributing mechanism in the fuel cell shown in FIG. 18, partly in cutaway.

The flow path plate 51 may be omitted though FIG. 18 and FIG. 19 show the fuel distributing mechanism 3 composed of the flow path plate 51 and the diffusion plate 53. Specifically, such a structure may be adopted that the diffusion plate 53 is disposed on a bottom surface side of a container in which the fuel cell unit 2 is disposed so that a hollow portion is formed between itself and the container, and the fuel distributing mechanism 3 is composed of these elements. In this case, the liquid fuel led between the container and the diffusion plate 53 is released toward a fuel electrode from the plural fuel discharge ports 22 provided in the diffusion plate 53 after spreading in the hollow portion. In this case, however, concentration distribution tends to occur in the surface-direction diffusion of the liquid fuel. Therefore, it is preferable that the spreading direction (diffusion direction) of the fuel is defined by the flow path plate 51 to enhance uniform diffusibility of the fuel.

As a concrete example (example 5) of the third embodiment, the fuel cell 50 having the structure shown in FIG. 18 and FIG. 19 was fabricated. First, the unit cell was fabricated with a fuel electrode formed by applying a Pt—Ru-based catalyst layer (10 mm×60 mm) on carbon paper and an oxidant electrode formed by applying a Pt black catalyst layer (10 mm×60 mm) on carbon paper. An electrolyte membrane made of a perfluorosulfonic acid film was sandwiched by the catalyst layers of four sets of the unit cells so that the catalyst layers came into contact with the electrolyte membrane. They were joined by hot pressing under the conditions of 120° C.×5 minutes with a 100 kg/cm² pressure, whereby the MEA was fabricated. Further, a through hole with a 0.2 mm pore diameter was formed at a center portion of each of the cells.

As shown in FIG. 18 and FIG. 19, the above-described MEA 2 was combined with the fuel distributing mechanism 3 composed of the flow path plate 51 and the diffusion plate 53 to be assembled into the container and the sealing part was further interposed, whereby an electricity generation unit was fabricated. As the diffusion plate 53, a Kapton film with a 0.1 mm thickness was used, and the fuel discharge ports 22 each with a 1 mm pore diameter were formed in the arrangement shown in FIG. 19. The fuel distributing groove 52 with a 1 mm depth was formed in the flow path plate 51 so as to extend along a longitudinal direction of the cell from the fuel injection direction. Further, the PTEF porous sheet 56 with a 0.1 mm thickness and a 0.1 μm pore diameter was disposed on the diffusion plate 53. The electricity generation unit and the fuel storage unit were connected via the fuel supply pump, whereby the fuel cell with a 24 cm² reaction area was fabricated. Methanol was intermittently supplied as the liquid fuel to this fuel cell by the pump to cause electricity generation. As oxidant gas, spontaneously taken air was used.

As a second concrete example (example 6) of the third embodiment, a fuel cell having the same structure as that of the example 5 except that neither the flow path plate 51 nor the porous sheet 56 was used and having a 24 cm² reaction area was fabricated. Specifically, the diffusion plate 53 was disposed on the bottom side of the container and a fuel diffusion chamber was provided between the diffusion plate 53 and the container. Methanol as the liquid fuel was intermittently supplied to this fuel cell by the pump to cause electricity generation. As oxidant gas, spontaneously taken air was used.

Further, as a concrete example (example 7) of the third embodiment, a fuel cell having the same structure as that of the example 5 except that the fuel distributing plate 23A shown in FIG. 3 and FIG. 4 was used as the fuel distributing mechanism 3 and having a 24 cm² reaction area was fabricated. In the fuel distributing plate 23A, the fuel injection port 22 and the plural fuel discharge ports 23 were connected by the thin tubes 25. Between the MEA 2 and the fuel distributing plate 23A, a fuel diffusion space was provided as in FIG. 18. Methanol as the liquid fuel was intermittently supplied to the fuel cell by the pump to cause electricity generation. As oxidant gas, spontaneously taken air was used.

Further, as an example for comparison with the present invention (comparative example 3), a fuel cell having the same structure as that of the example 6 except that a silicone rubber sheet was used in place of the diffusion plate 53 and having a 24 cm² reaction area was fabricated. The silicone rubber sheet used in place of the diffusion plate 53 diffuses the fuel based on its own methanol permeability. Methanol as the liquid fuel was intermittently supplied to this fuel cell by the pump to cause electricity generation. As oxidant gas, spontaneously taken air was used.

Figure 20:
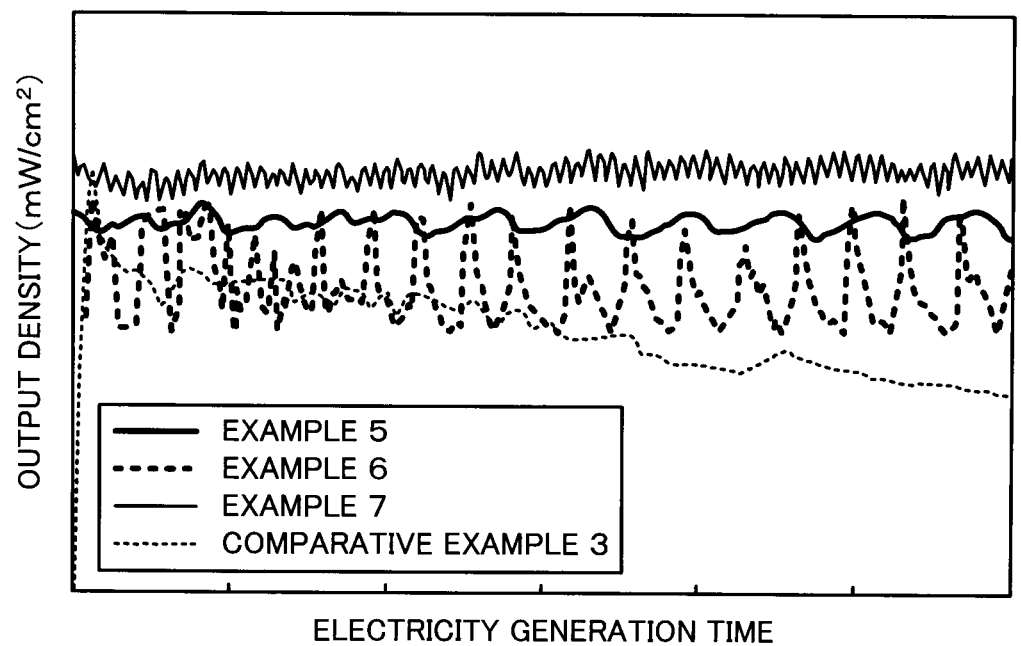
FIG. 20 is a chart showing time-output density characteristics of fuel cells according to examples of the present invention.

Time-output density characteristics of the fuel cells according to the examples 5 to 7 and the comparative example 3 described above are shown in FIG. 20. As is apparent from FIG. 20, in the example 6, periodic fluctuation in the output density due to the intermittent operation of the pump is observed, but the output level is kept substantially constant. In the example 5 adopting the flow path structure, periodic fluctuation in the output density is small and thus the output characteristic which is stable even with time can be obtained owing to its excellent uniformity of the fuel diffusion. In the example 7, the output itself is further improved. On the other hand, in the comparative example 3, stable time-dependent characteristic is not obtained since the permeation of water vapor generated at the time of the electricity generation occurs in the space to which the fuel is supplied, and accordingly the fuel concentration is lowered and thus the output density becomes low.

The fuel cells 1, 30, 50 of the above-described embodiments exhibit the effects when using various kinds of liquid fuels and the kind and concentration of the liquid fuel are not limited. The characteristic of the fuel distributing mechanism 3 having the plural fuel discharge ports 22 is prominently exhibited when the fuel concentration is high. Therefore, the fuel cells 1, 30, 50 of the embodiments exhibit the performance and effects especially when methanol with a concentration of 80% or higher is used as the liquid fuel. Therefore, the embodiments are preferably applied to a fuel cell using, as the liquid fuel, methanol with a 80% concentration or higher.

It should be noted that the present invention is applicable to various kinds of fuel cells using a liquid fuel. The concrete structure of the fuel cell, the supply form of the fuel, and so on are not specifically limited, either, and the present invention is applicable to various forms such as a case where all the fuels supplied to the MEA are vapor of the liquid fuel, a case where all the fuels supplied to the MEA are liquid fuels, or a case where part thereof is vapor of a liquid fuel supplied in a liquid form. When carried out, the present invention can be embodied by modifying the constituent elements within a range not departing from the technical idea of the present invention. Moreover, various modifications can be made such as appropriate combination of the plural constituent elements shown in the above-described embodiments, the deletion of some of the constituent elements out of all the constituent elements shown in the embodiments, and so on. The embodiments of the present invention may be expanded or changed within a range of the technical idea of the present invention, and the expanded and changed embodiments are also included in the technical scope of the present invention.

INDUSTRIAL APPLICABILITY

The fuel cell according to the embodiments of the present invention has the fuel distributing mechanism distributing and supplying the fuel to the fuel electrode side of the fuel cell unit. Therefore, according to the fuel cell relating to the modes of the present invention, the supply state of the fuel to the cell unit is made uniform and accordingly the electricity generation reaction becomes efficient, which can improve the output.

What is claimed is:
1. A fuel cell, comprising:
a membrane electrode assembly having a fuel electrode, an air electrode, and an electrolyte membrane sandwiched by the fuel electrode and the air electrode;
a fuel distributing mechanism disposed on a fuel electrode side of the membrane electrode assembly to supply a fuel to a plurality of places of the fuel electrode; and
a fuel storage unit storing a liquid fuel and connected to the fuel distributing mechanism via a flow path,
wherein the fuel distributing mechanism includes a fuel distributing plate having a fuel injection port into which the liquid fuel flows via the flow path, and a plurality of fuel discharge ports connected to the fuel injection port via a thin tube provided therein as a fuel passage,
wherein the thin tube has branching points and sequentially branches off at the branching points from the fuel injection port toward the plural fuel discharge ports, and
wherein each of the branching points satisfies $A \geq B$, where A is a sectional area of the thin tube before the branching at the branching point, and B is a sum of sectional areas of the thin tubes after the branching.
2. The fuel cell according to claim 1,
wherein a fuel diffusion space where the fuel is diffused is provided between the fuel electrode and the fuel distributing mechanism.
3. The fuel cell according to claim 1, further comprising,
at least one porous body disposed between the fuel electrode and the fuel distributing mechanism.
4. The fuel cell according to claim 3,
wherein the porous body is made of at least one selected from a porous resin sheet, resin nonwoven fabric, and resin woven fabric.
5. The fuel cell according to claim 1, further comprising,
a balance valve connected to the fuel storage unit or the flow path to adjust an internal pressure in the fuel storage unit by leading outside air into the fuel storage unit.
6. The fuel cell according to claim 1, further comprising,
a fuel supply pump provided in the flow path.
7. The fuel cell according to claim 6,
wherein the fuel supply pump is an electroosmosis flow pump, a diaphragm pump, a rotary vane pump, or a squeeze pump.
8. The fuel cell according to claim 6,
wherein liquid fuel delivery capability of the fuel supply pump is within 10 μL/minute to 1 mL/minute.
9. The fuel cell according to claim 6,
wherein an operation of the fuel supply pump is controlled according to at least an output from the membrane electrode assembly.
10. The fuel cell according to claim 1, further comprising:
a fuel supply pump provided in the flow path;
a balance valve connected to the flow path between the fuel storage unit and the fuel supply pump or to the fuel storage unit to adjust an internal pressure in the fuel storage unit by leading outside air into the fuel storage unit; and
a gas vent hole provided in the membrane electrode assembly,
wherein a liquid delivery pressure from the fuel supply pump to the fuel distributing mechanism is 5 kPa or higher.
11. The fuel cell according to claim 1, further comprising,
a fuel shut-off valve disposed in the flow path to shut off the supply of the liquid fuel to the fuel distributing mechanism.
12. The fuel cell according to claim 11, further comprising,
a fuel supply pump disposed in the flow path between the fuel storage unit and the fuel shut-off valve.
13. The fuel cell according to claim 12,
wherein the fuel shut-off valve is opened before the fuel supply pump starts a liquid delivery operation, and is closed after the fuel supply pump stops the liquid delivery operation.
14. The fuel cell according to claim 11,
wherein the fuel shut-off valve is a valve with an open/closed state maintaining mechanism to which driving power is applied only when a state is changed between an open state and a closed state.
15. The fuel cell according to claim 1,
wherein the liquid fuel is a methanol fuel.
16. The fuel cell according to claim 1,
wherein the methanol fuel is a methanol aqueous solution whose methanol concentration is 80% or higher or pure methanol.
17. A fuel cell, comprising:
a membrane electrode assembly having a fuel electrode, an air electrode, and an electrolyte membrane sandwiched by the fuel electrode and the air electrode;
a fuel distributing mechanism disposed on a fuel electrode side of the membrane electrode assembly to supply a fuel to a plurality of places of the fuel electrode; and
a fuel storage unit storing a liquid fuel and connected to the fuel distributing mechanism via a flow path,
wherein the fuel distributing mechanism includes a fuel distributing plate having a fuel injection port into which the liquid fuel flows via the flow path, and a plurality of fuel discharge ports connected to the fuel injection port via a thin tube provided therein as a fuel passage, and
wherein a sectional area of each of the fuel discharge ports is equal to or larger than a sectional area of the thin tube connected to the fuel discharge port.
18. The fuel cell according to claim 17,
wherein a fuel diffusion space where the fuel is diffused is provided between the fuel electrode and the fuel distributing mechanism.

19. The fuel cell according to claim 17, further comprising:
at least one porous body disposed between the fuel electrode and the fuel distributing mechanism.

20. The fuel cell according to claim 17, further comprising:
a balance valve connected to the fuel storage unit or the flow path to adjust an internal pressure in the fuel storage unit by leading outside air into the fuel storage unit.

21. The fuel cell according to claim 17, further comprising:
a fuel supply pump provided in the flow path.

22. The fuel cell according to claim 21,
wherein the fuel supply pump is an electroosmosis flow pump, a diaphragm pump, a rotary vane pump, or a squeeze pump.

23. The fuel cell according to claim 17, further comprising:
a fuel supply pump provided in the flow path;
a balance valve connected to the flow path between the fuel storage unit and the fuel supply pump or to the fuel storage unit to adjust an internal pressure in the fuel storage unit by leading outside air into the fuel storage unit; and
a gas vent hole provided in the membrane electrode assembly,
wherein a liquid delivery pressure from the fuel supply pump to the fuel distributing mechanism is 5 kPa or higher.

24. The fuel cell according to claim 17,
wherein the liquid fuel is a methanol fuel.

\* \* \* \* \*